No. 615,139. Patented Nov. 29, 1898.
S. CHAMBERS.
NUT LOCK.
(Application filed Aug. 5, 1898.)
(No Model.)
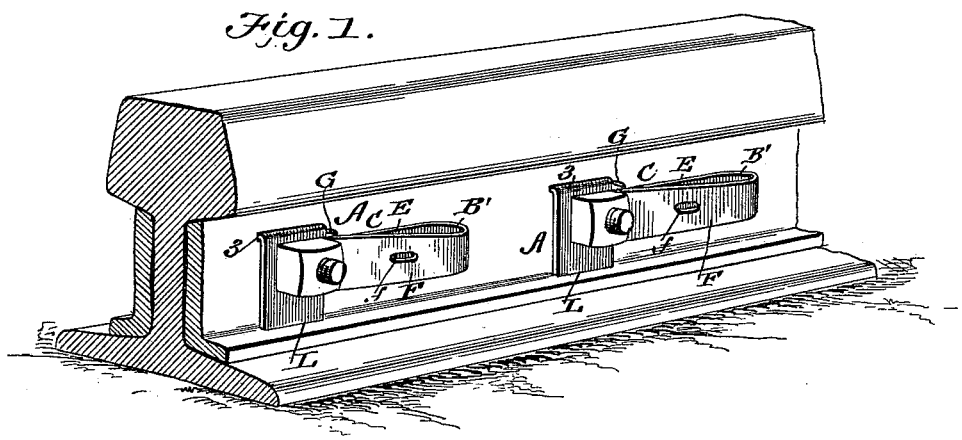
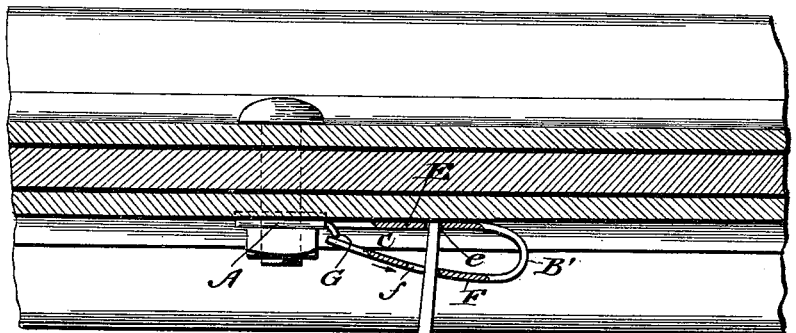
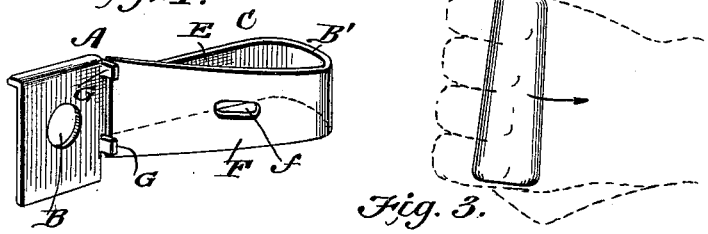
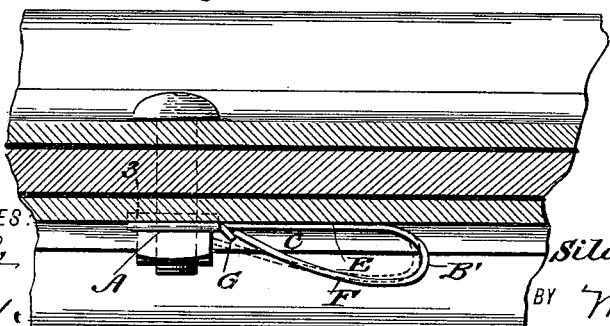
WITNESSES
M. S. Blondel,
P. B. Turpin
INVENTOR
Silas Chambers.
BY Munn & Co.
ATTORNEYS.
THE NORRIS PETERS CO., PHOTO-LITHO., WASHINGTON, D. C.

UNITED STATES PATENT OFFICE.

SILAS CHAMBERS, OF STERLING CITY, TEXAS.

NUT-LOCK.

SPECIFICATION forming part of Letters Patent No. 615,139, dated November 29, 1898.

Application filed August 5, 1898. Serial No. 687,835. (No model.)

*To all whom it may concern:*

Be it known that I, SILAS CHAMBERS, residing at Sterling City, in the county of Sterling and State of Texas, have invented certain new and useful Improvements in Nut-Locks, of which the following is a full, clear, and exact specification.

My invention is an improvement in nut-locks, and has for its object to provide a construction simple and inexpensive, which will effectually lock the nut, can be conveniently adjusted into and out of locked position, and will be durable.

The invention consists in the special construction of the nut-locking washer, as will be hereinafter described, and pointed out in the claims.

In the drawings, Figure 1 shows the invention as in use and adjusted to lock the nut of a rail-joint. Fig. 2 is a sectional view of the nut-lock, illustrating the manner of unlocking the same. Fig. 3 is a sectional view showing the nut-lock in unlocked position, and Fig. 4 is a detail perspective view of the locking device.

My invention may be applied to rail-joints of any suitable construction, to bridge construction, and to other locations where it may be desired to lock a nut or a bolt-head from turning.

In rail-joints and other locations where a surface is provided to receive the edge of the washer at L such edge may be located, as shown in Fig. 1, to lock the washer from turning; or when such a surface is not provided the locking-washer may be held from turning in other suitable manner—such, for instance, as shown, and consisting of a flange to turn from the edge of the locking-washer and entering a groove or recess at 3 in the surface against which the locking-plate is clamped by the nut.

The locking-washer A is provided with an opening B for the bolt and has a locking-tongue C, which is turned back upon itself at B', forming the inner and outer wings E and F, each of which has an opening *e f*, and the free end of the wing F is arranged, in practice, to bear against the edge of a nut and lock the same from turning, as will be understood from Figs. 1 and 2. The tongue is formed with such a tension that its outer wing has its free end normally pressed inward toward the washer and longitudinally toward the nut, so such end of the wing F will, when unrestrained, be pressed strongly toward the edge of the nut at the base of the latter, such free edge being preferably slightly raised above the body of the washer, so the locking-tongue will not project under the nut. This elevation of the free end of the tongue is preferably effected by means of the devices which serve to hold the tongue out of engagement with the nut. This is shown consisting of the upturned portions G on the washer, which serve as a shoulder for engagement by the free end of the tongue when sprung out of locked position and operate to hold the tongue out of such position, as will be understood from Fig. 3 of the drawings.

The holes *e* and *f* operate as seats for a scribe-awl or similar tool, which is passed through the hole *f* and fits at its end in the hole *e*, such end being the fulcrum in the operation of releasing the nut-lock. In such operation the awl or other pointed instrument is applied and the wing F pressed back until its point will spring in engagement with the upturned portions G on the washer, which will operate as a seat to hold the tongue out of engagement with the nut, which can then be applied or removed, the readjustment of the locking-tongue being easily effected by simply lifting this point out of engagement with the seat or shoulder G.

My invention possesses special advantages in the ease of the application and operation of the locking devices, as it does not require the special tool for releasing the lock, as such result can be secured by an ordinary nail. It is to be noticed, further, that my lock possesses no parts subject to excessive wear or likely to get out of order and that in use it will last until destroyed by rust.

Having thus described my invention, what I claim, and desire to secure by Letters Patent, is—

1. A nut-locking washer having a returned tongue whose extremity is given a longitudinal tension and a tension toward the surface of the washer, and detent means whereby to retain said extremity out of locked position when adjusted longitudinally from such locked position substantially as set forth.

2. A nut-locking washer having a returned tongue whose inner and outer wings are both provided with openings for the insertion of a suitable tool whereby such tool may bear in both such openings at the same time in the operation of the device substantially as described.

3. A nut-locking plate or washer having a returned tongue arranged to bear at its free end against the nut to be locked and having at such free end a longitudinal tension and a tension toward the plate or washer and a projecting portion on the washer whereby to form a seat by which to hold the free end of the tongue out of locked position substantially as set forth.

4. A nut-locking plate having a tongue formed with inner and outer wings both of which are provided with openings for the operating-tool whereby such tool may bear in both such openings at the same time substantially as set forth.

5. A nut-locking plate or washer having a returned tongue and an upwardly-projected portion or portions by which to hold the free end of said tongue out of locked position substantially as set forth.

6. A nut-locking plate or washer having a returned tongue whose point has a longitudinal tension and a tension toward the washer or plate, the latter being provided with a projecting portion or portions arranged to hold the free end of the tongue elevated in the locked position thereof and to secure such end of the tongue when the latter is adjusted to unlocked position substantially as set forth.

7. The nut-locking plate herein described having the washer provided with an opening for the bolt and the projecting returned tongue having inner and outer wings provided with openings for insertion of an operating-tool, and a washer being provided with upturned portions whereby to secure the point of the tongue out of locked position and to elevate such tongue when the same is in locked position all substantially as and for the purposes set forth.

SILAS CHAMBERS.

Witnesses:
E. F. FISHER,
D. T. LEWTER.